A. C. & T. R. BELL.
ALTERNATING CURRENT MOTOR.
APPLICATION FILED NOV. 23, 1908.

935,352.

Patented Sept. 28, 1909.

Witnesses:
F. D. Sweet
J. W. Springmeyer

Inventors
Alonzo C. Bell and Thaddeus R. Bell
by E. W. Cherry Jr.
their Attorney.

UNITED STATES PATENT OFFICE.

ALONZO C. BELL AND THADDEUS R. BELL, OF WESTFIELD, NEW JERSEY.

ALTERNATING-CURRENT MOTOR.

935,352.

Specification of Letters Patent.   Patented Sept. 28, 1909.

Application filed November 23, 1908. Serial No. 463,958.

*To all whom it may concern:*

Be it known that we, ALONZO C. BELL and THADDEUS R. BELL, both citizens of the United States, and residents of Westfield, Union county, and State of New Jersey, have invented certain new and useful Improvements in Alternating-Current Motors.

Our present invention relates to improvements in alternating current motors and more particularly to self-starting single phase motors, and has for its object an efficient single phase motor which shall be self-starting.

Figure 1:
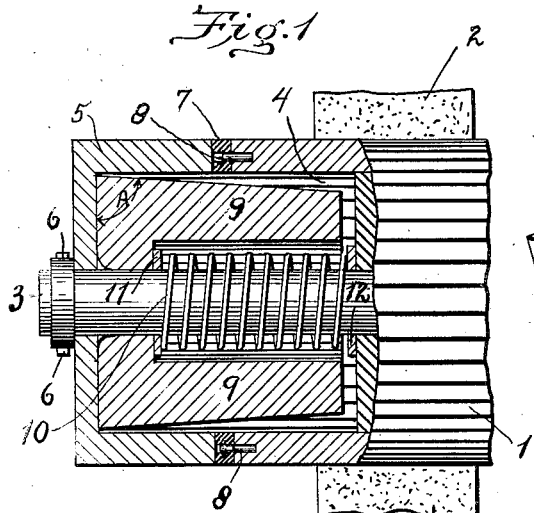
Figure 2:
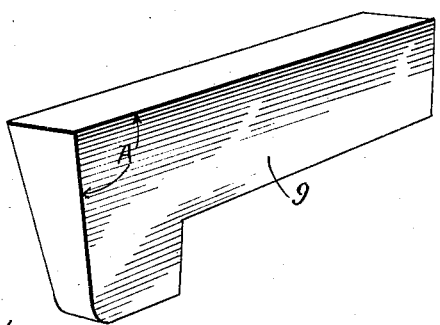
Figure 3:
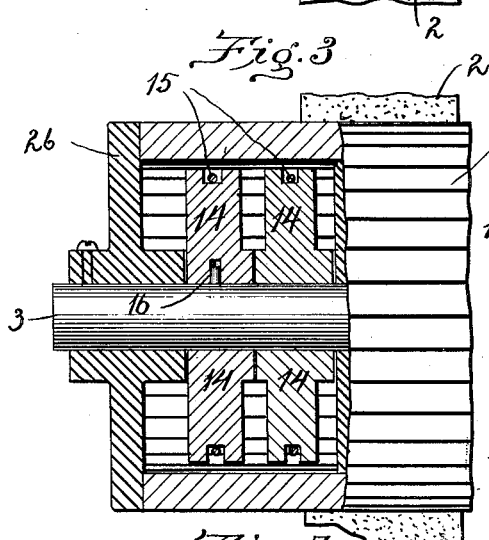
Figure 4:
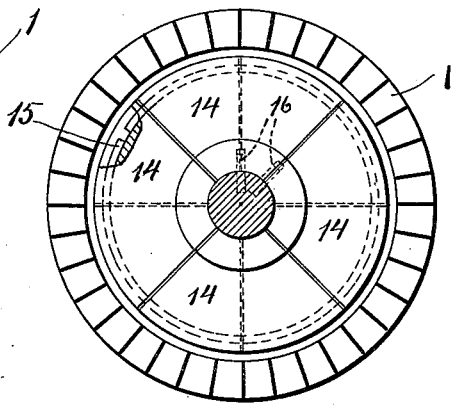
Figure 5:
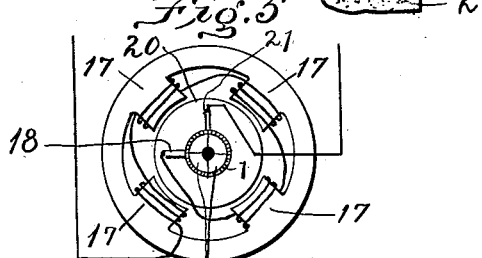
Figure 6:
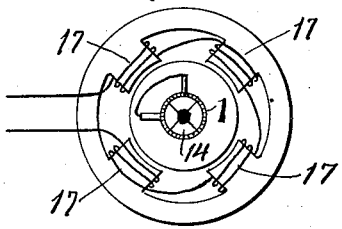

In the drawings, Figure 1 is an elevation partly in section of the commutator end of a motor provided with one form of our improvements; Fig. 2 is an enlarged perspective view of one of the parts in Fig. 1; Fig. 3 is an elevation partly in section of the commutator of a motor provided with a modified form of our improvements; Fig. 4 is an end elevation thereof looking at the left hand end of the devices in Fig. 3 with the cap or cover removed; and Figs. 5 and 6 are diagrammatic views of different kinds of electrical connections in a motor embodying our improvements.

Describing now our invention with particular reference to the devices of the drawings and reserving it to the claims to point out the novel features, we will first describe the devices of the form of our improvements shown in Figs. 1 and 2. 1 is the commutator which may be of any usual or preferred type having brushes 2 in connection therewith. The commutator as usual is mounted on the motor shaft 3. For the purpose of our invention this shaft will preferably extend somewhat beyond the end of the commutator, which latter is turned out to form a cup 4 concentric with the shaft. Mounted on the end of the shaft is a member 5 having a cupped-out interior facing the cup in the end of the commutator, said member being hereinafter referred to as a cap and being rigidly secured to the shaft by set screws 6. Furthermore said member will be of conducting material such as metal and will have its rim out of contact with the adjoining rim of the end of the commutator, as for example by being separated therefrom by an air space or preferably, to exclude dust, by having an interposed ring 7 of fiber or other insulating material snugly held between the abutting rims. To hold said insulating ring against lateral displacement it may be pinned to one or the other of the rims. Thus in the particular devices shown the pins 8, with their head ends well countersunk in the insulating ring so as not to contact with the cup, have their other ends penetrating certain of the commutator bars. Within the chamber surrounding the shaft are located segments 9 which may take more or less the elbow form shown. There are a plurality of these segments preferably a number equal to or greater than the number of commutator bars. Moreover said segments will be of conducting material such as copper. The segments will be nested in the space about the shaft with their elbows located in the corners of the cap 5 with their preferably longer arms extending horizontally into the commutator recess and with their other arms extending radially toward the shaft. Surrounding the shaft is a spiral spring 10 located between the commutator and the radial arms of the segments to press said arms outwardly against the end of the cap 5 and thereby tilt the horizontal arms of all of said segments out of contact with the cylindrical interior of the recess in the commutator. For this purpose it will be noted that the angle A of each segment, being the outside angle at the elbow of the segment, is less than 90° so that when the radial arms of the segments are pressed to the left by the spring, their horizontal arms are carried away from the cylindrical interior of the commutator cup.

A washer 11 on the shaft is interposed between the spring and the radial arms of the segments to more effectively transmit the thrust of the spring against said arms. Moreover in assembling the devices a washer 12 or washers may be interposed between the other end of the spring and the end of the commutator to give the spring increasing tension up to the desired extent.

When the motor is running at slow speeds as in starting and before it has attained normal running speed, the spring 10 is designed to be sufficient to counteract the centrifugal force acting on the segments and hold their horizontal arms out of contact with the commutator bars. On the contrary when the motor has come up to speed, said spring is overpowered and centrifugal force carries the horizontal arms of all of the segments outwardly into contact with the commutator bars, thereby short-circuiting all of said bars through the segments and the cap 5.

It will be noted that the segments have no movement of rotation relative to the commutator bars or cap. On the contrary when the segments have been thrown out against the commutator bars they are stationarily held, consequently there is no frictional wear or sparking.

In Figs. 3 and 4 we have shown a modification in which the elbow segments and spiral spring are substituted by a plurality of sectors 14, each set of which makes up a more or less complete disk, of which there may be one or more. Thus in the devices shown there are two of these disks each made up of four sectors. The sectors of each disk are grooved about their periphery to receive a ring of spring wire 15 open at one point to allow the springiness of the wire normally to press all of the sectors inward toward their common center. At the center each disk of segments is provided with a shaft opening. The disks may be simply slipped on to the end of the shaft within the recess in the end of the commutator, in which case the disk openings are best made smaller than the cross-section of the shaft, so that the segments grip the shaft due to springs 15 and are carried with it. The spring 10 acts similarly in the form shown in Fig. 1, since there also the segments 8 are spring-held in carrying contact with a part of the motor. Of coure a suitable cap 26 may be provided to close said recess and prevent the disks from coming off the shaft. When the motor is started the springs 15 hold the sectors out of contact with the commutator bars. As soon however as the motor is up to speed said springs are overpowered by centrifugal force and the sectors fly outwardly against the commutator bars and thereafter rotate stationarily with the commutator and have the effect of short circuiting said bars. It is feasible to get along with one of said disks, although it is desirable to have two or more to insure the short-circuiting of all of the commutator bars. Moreover even when using a plurality of disks it is preferable to key them to the motor shaft so that by no possibility can their sectors fly out with the inter-sector spaces alined. Accordingly the preferred construction is that indicated in Figs. 3 and 4, wherein there are two disks each keyed to the shaft with their sectors staggered, that is to say with the inter-sector spaces of one disk located adjacent to the sectors of the other disk. To accomplish the keying of the disks to the shaft, one of the sectors of each disk may be radially bored from its inner edge to receive a pin 16 on the shaft which obviously prevents the disks from getting out of staggered relation without interfering with the radial movement of the sectors to and away from the shaft.

In Figs. 5 and 6 we have shown diagrammatically two of the ways in which a single-phase motor provided with our improvements may be operated. In Fig. 5 the current having passed through the field 17 is delivered by brush 18 to the commutator 1, thence through the armature 20 and out by the brush 21 back to the main. Our attachment is represented by the sectors 14 intended to indicate the corresponding members of the devices shown in Figs. 3 and 4. When the motor is starting, it will be obvious from what has been said before, that the current will be delivered not only through the field but also through the armature which will accordingly be self-starting. Having come up to speed the sectors of our attachment will fly out under centrifugal force, short-circuiting all of the commutator bars, thereby converting the armature into one of the squirrel-cage type and will also short circuit the brushes, from which time on the motor will run as an induction motor. Of course it will be understood that Figs. 5 and 6 are merely diagrammatic views to show the electrical connections; also that while the particular form of our improvements indicated is that of Figs. 3 and 4, the same connections will apply to the form shown in Figs. 1, and 2, etc. The connections and devices shown in Fig. 6 are the same as those in Fig. 5 with the exception that the brushes, instead of being connected in series with the field, have no connection with the field but are connected with each other. The result is that when a single phase current is thrown on the field, the motor is self-starting as a repulsion motor and upon coming up to speed, has its armature bars short-circuited as before, together with its brushes, and thereafter runs as an induction motor.

Having thus described our invention, what we claim is:—

1. In a self-starting single-phase motor, the combination of a commutator having its bars overhanging the end of the commutator to form a cylindrical recess surrounding the motor shaft; said shaft; a cap mounted on the shaft having a cylindrical recess corresponding to and facing the commutator recess, said cap being continuously conducting for electricity around its cylindrical wall; a plurality of conducting segments nested radially about the motor shaft within the space consisting of the combined cap and commutator recesses, each of said segments having a horizontal arm and a radial arm, the horizontal arms extending from the cap recess into the commutator recess and the radial arms being directed from the periphery of the cap toward the shaft; and a spring located between the end of the commutator and the radial arms of the segments holding their horizontal arms out of contact with the cylindrical interior of the commutator recess and being overpowered by the centrifugal force acting on the segments when the motor is up to speed.

2. A self-starting single-phase motor comprising a commutator having its bars overhanging the end of the commutator to form a recess surrounding the motor shaft; said shaft; a plurality of segments radially nested in said recess about the motor shaft, said segments being individually conducting for electricity, each having an elbow form with a horizontal arm and a radial arm, the horizontal arms of the segments extending in the direction of the length of the commutator bars and the radial arms being directed inwardly toward the shaft; means electrically connecting said segments together and a spiral spring surrounding the shaft acting against the radial arms of the segments and holding their horizontal arms out of contact with the commutator bars, said spring being opposed by centrifugal force acting on the horizontal arms of the bars and being overpowered when the motor is up to speed.

3. In a self-starting single phase motor, the combination of a rotor; a commutator having an end recess exposing interiorly its bars; conducting segments movably contained in said recess which short-circuit the commutator bars when moved into contact therewith; and a spring holding the segments in contact with the rotor to carry them about with said rotor, said spring also holding the segments yieldingly out of contact with the commutator bars and being opposed by centrifugal force acting on the segments and being overcome thereby when the rotor is at speed.

4. In a self-starting single phase motor, the combination of a rotor; a commutator having an end recess exposing interiorly its bars; conducting segments in said recess carried about with the rotor and movable into short-circuiting contact with the commutator bars due to the centrifugal action of the segments when the rotor is at speed; and yielding means keeping the segments out of contact with the bars and being overcome by the centrifugal action of the segments when the rotor is at speed.

In testimony whereof we have signed our names to the foregoing specification in the presence of two subscribing witnesses.

ALONZO C. BELL.
THADDEUS R. BELL.

Witnesses:
F. W. MORSE,
THOS. GILLIGAN.